(12) United States Patent
Shue et al.

(10) Patent No.: US 9,081,960 B2
(45) Date of Patent: Jul. 14, 2015

(54) ARCHITECTURE FOR REMOVABLE MEDIA USB-ARM

(71) Applicant: UT-Battelle, LLC, Oak Ridge, TN (US)

(72) Inventors: Craig A. Shue, Worcester, MA (US);
Logan M. Lamb, Knoxville, TN (US);
Nathanael R. Paul, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 94 days.

(21) Appl. No.: 13/870,743

(22) Filed: Apr. 25, 2013

(65) Prior Publication Data

US 2013/0291112 A1    Oct. 31, 2013

Related U.S. Application Data

(60) Provisional application No. 61/639,172, filed on Apr. 27, 2012.

(51) Int. Cl.
| | | |
|---|---|---|
| *G06F 11/00* | (2006.01) | |
| *G06F 12/14* | (2006.01) | |
| *G06F 12/16* | (2006.01) | |
| *G08B 23/00* | (2006.01) | |
| *G06F 21/56* | (2013.01) | |

(52) U.S. Cl.
CPC ............ *G06F 21/561* (2013.01); *G06F 21/562* (2013.01)

(58) Field of Classification Search
CPC ......... G06F 21/00; G06F 21/50; G06F 21/56; G06F 21/561; G06F 21/562
USPC ........................................................ 726/24
See application file for complete search history.

(56) References Cited

U.S. PATENT DOCUMENTS

| | | |
|---|---|---|
| 2005/0010918 A1 | 1/2005 | Childs et al. |
| 2005/0120242 A1 | 6/2005 | Mayer et al. |
| 2007/0056035 A1 | 3/2007 | Copley |
| 2008/0276302 A1 | 11/2008 | Touboul |
| 2009/0113128 A1 | 4/2009 | Zhao |
| 2010/0011442 A1 | 1/2010 | Zhao |
| 2010/0083381 A1* | 4/2010 | Khosravi et al. ................ 726/24 |
| 2010/0212012 A1 | 8/2010 | Touboul et al. |
| 2010/0250797 A1* | 9/2010 | Khosravi et al. ................ 710/48 |
| 2011/0107423 A1* | 5/2011 | Kolar Sunder et al. ......... 726/24 |
| 2011/0289308 A1* | 11/2011 | Sobko et al. ................... 713/100 |

FOREIGN PATENT DOCUMENTS

| | | |
|---|---|---|
| CA | 2680231 | 5/2009 |
| CN | 101452619 A | 6/2009 |
| CN | 101452619 B | 4/2011 |

* cited by examiner

*Primary Examiner* — Dant Shaifer Harriman
(74) *Attorney, Agent, or Firm* — Brinks Gilson & Lione

(57) ABSTRACT

A storage device is coupled to a computing system comprising an operating system and application software. Access to the storage device is blocked by a kernel filter driver, except exclusive access is granted to a first anti-virus engine. The first anti-virus engine is directed to scan the storage device for malicious software and report results. Exclusive access may be granted to one or more other anti-virus engines and they may be directed to scan the storage device and report results. Approval of all or a portion of the information on the storage device is based on the results from the first anti-virus engine and the other anti-virus engines. The storage device is presented to the operating system and access is granted to the approved information. The operating system may be a Microsoft Windows operating system. The kernel filter driver and usage of anti-virus engines may be configurable by a user.

18 Claims, 5 Drawing Sheets

ARCHITECTURE FOR REMOVABLE MEDIA USB-ARM

CROSS REFERENCES TO RELATED APPLICATIONS

1. Related Patents and Applications

This patent application makes reference to and claims priority to U.S. Provisional Patent Application Ser. No. 61/639,172, filed on Apr. 27, 2012, which is hereby incorporated herein by reference in its entirety.

STATEMENT REGARDING FEDERALLY FUNDED RESEARCH AND DEVELOPMENT

This invention was made with government support under Contract No. DE-AC05-00OR22725 between UT-Battelle, LLC. and the U.S. Department of Energy. The government has certain rights in the invention.

BACKGROUND OF THE INVENTION

1. Technical Field

The present disclosure relates to removable devices for storing electronic media and more specifically to machines and methods for malware detection of the media for increased network security.

2. Related Art

The advent of high capacity mobile storage, such as USB flash media, has increased the convenience of sharing files between users. Unfortunately, this sharing also allows the distribution of viruses and other malicious software, called malware. Malware can be distributed from even seemingly innocuous sources, such as from fellow conference attendees or from vendors providing a product. When a storage device is plugged into a computer, it may be detected by the computer's operating system and identified as having a particular file system. The operating system may read the file system so that it may display its contents to users.

Frequently, malware will target "auto-run" functionality of popular operating systems, causing them to immediately execute when the media is inserted or attached. Malware has becomes such a significant problem that organizations have taken dramatic steps to avoid malware carried in removable media. In some cases, organizations may simply seal USB drives to prevent media from being inserted. Other organizations require that all media be examined by a security consultant who will scan and certify the media before it can be used on company machines. Both of these approaches interfere with the convenience of these media and decrease user productivity.

SUMMARY

Architecture for removable media may provide secure access to storage media. A computing system may comprise one or both of an operating system and application software. The computing system may be communicatively coupled to a storage device comprising stored information. The computing system may block all access to the storage device except for granting exclusive access to a first anti-virus engine. The first anti-virus engine may be directed to scan the information stored on the storage device, for malicious software. Results may be received from the first anti-virus engine. The storage device may be presented to the operating system. Access to approved information stored on the storage device may be enabled in instances when all or a portion of the stored information is approved.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Architecture for removable media (ARM) may protect a computing or communication system from effects of malicious software before presenting a storage device to the system for access. In some systems the storage device may be a removable media device. The ARM system may allow a user the convenience of using the removable media device while overcoming some of the short comings of traditional methods of anti-virus scanning. The ARM system may allow access only after anti-virus sweeps are complete and may prohibit read or execute access to any executables on the storage device to prevent zero-day attacks. In some systems, the ARM system may eliminate a race condition between security software and "auto-run" functionality of an operating system or between the security system and a user selecting a file. Moreover, the ARM system may enable use of a plurality of third party anti-virus engines for scanning files in the storage device.

The ARM system may determine when a memory device is available for access. For example, the ARM system may detect when a removable media device is attached to the computing or communication system. The ARM system may isolate information which is stored on the removable device from the computing system's operating system and/or application software. The ARM system may comprise low level kernel software that may control access to the removable media device thereby preventing a security breach by any malicious software that may be stored on the removable storage device. Once it is determined that the stored information is clear of any malware, the ARM system may present the media to the operating system, at which point it may become available to users and applications.

Figure 1:
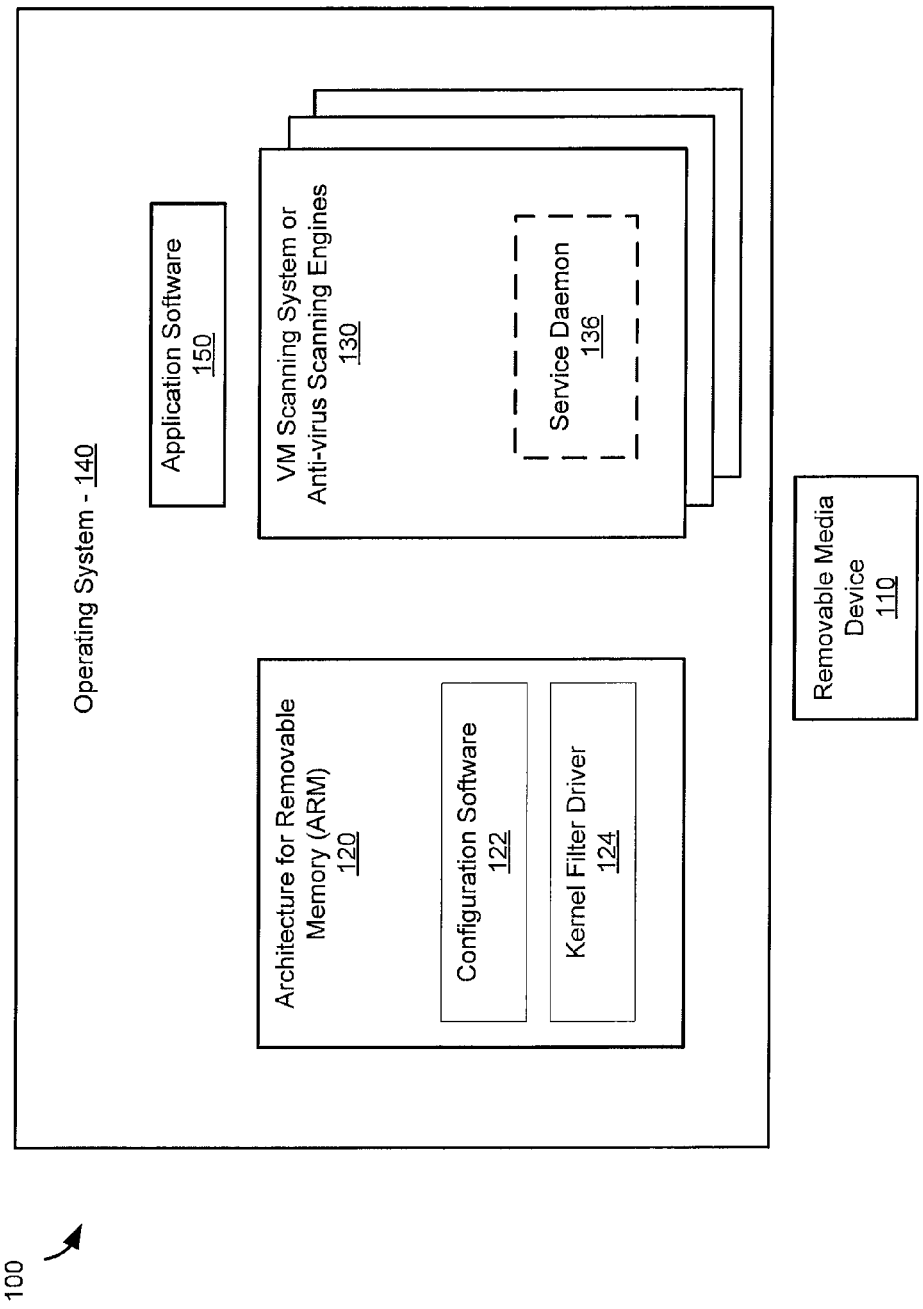
FIG. 1 illustrates an architecture for removable media which may utilize one or more anti-virus engines for scanning files stored on a storage device.

Turning to the figures, FIG. 1 illustrates an architecture for removable media which may utilize one or more anti-virus engines for scanning files stored on a storage device. The system 100 may comprise software including an operating system 140, an architecture for removable memory (ARM) system 120, one or more anti-virus scanning engines 130 and application software 150. The ARM system 120 may include configuration software 122 and/or a kernel filter driver 124. The one or more anti-virus scanning engines 130 may comprise one or more service daemons 136. The system 100 may also include a removable media device 110.

Figure 5:
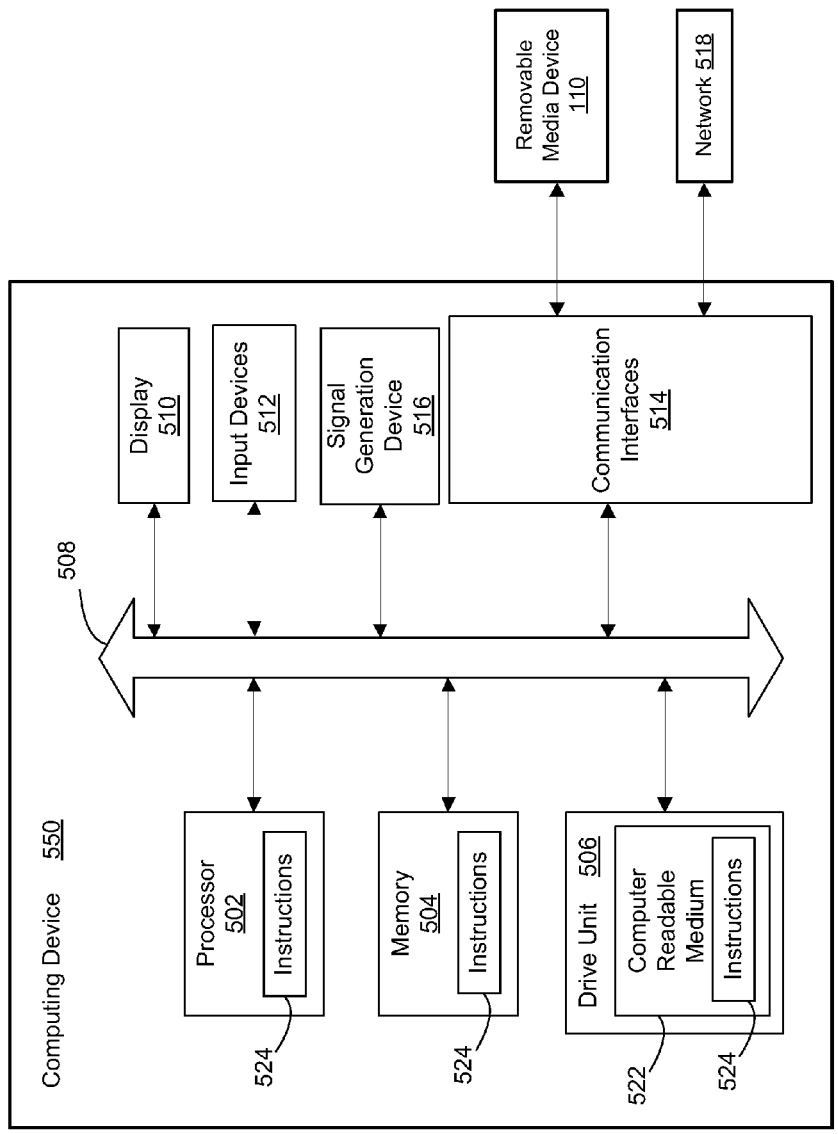
FIG. 5 illustrates one embodiment of a computing device that may host an architecture for removable media system.

The operating system 140, ARM system 120 and one or more anti-virus scanning engines 130 may be stored on a computing or communication system, for example, the computer system 550 described with respect to FIG. 5. The removable media device 110 may be communicatively coupled to the computing system 550. The ARM system 120 and/or the one or more anti-virus scanning engines 130 may provide security operations for the computer system 550 prior to allowing the operating system 140, application software 150 or a user, to gain access to information stored on the removable media device 110. In this regard, the ARM system 120 may grant exclusive access to an anti-virus scanning engine 130 prior to presenting the removable media device 110 to software on the computing system 550.

The operating system 140 may be stored on the computer system 550 described with respect to FIG. 5. The operating system 140 may comprise software that is operable to manage hardware resources and/or provide services for computer programs running in the computer system 550. In some systems, the operating system 140 may include the Microsoft Windows operating system. However, the operating system 140 is not limited in this regard and any suitable operating system may be utilized.

The removable media device 110 may be communicatively coupled to the computer system 550. In some systems, the removable media device 110 may comprise a Universal Serial Bus (USB) flash drive which may include flash memory with an integrated USB interface. It may be referred to as a thumb drive or jump drive, for example. The removable media device 110 may be portable and it may be rewritable. However, the system 100 is not limited in this regard and any suitable memory device may be utilized as the removable media device 110 or may be referred to as the removable media device 110. For example, the removable media device 110 may comprise an optical disc, such as a Blue-ray disc, DVD or compact disc (CD). Moreover, the removable media device 110 may comprise FireWire media or a memory card such as a CompactFlash card, a Secure Digital (SD) Card, a memory stick and floppy or zip disk. Furthermore, the ARM system 120 and/or the one or more anti-virus engines 130 may be operable to process information stored in a remote memory device or received via a network or email by the computer system 550. In this regard, the remote memory may be referred to as the removable media device 110. In some systems, there may be a plurality of removable media devices 110 included in the system 100 that may be processed in series or in parallel by the ARM system 120. The removable media device 110 may comprise stored data, metadata or software such as executable code or instructions. However, the system is not limited with regard to the type of information stored on the removable media device 110. The removable media device 110 may be referred to as storage, memory, remote memory or external memory, for example.

The one or more anti-virus scanning engines 130 may be operable to scan or screen software and/or data files which are stored on the removable media device 110 or stored on other memory devices communicatively coupled to the computer system 550. The one or more anti-virus engines 130 may be operable to detect and/or remove malicious software, which may be referred to as malware. For example, the malware may include computer viruses, malicious browser helper objects (BHOs), computer worms, ransomware, trojan horses, keyloggers, rootkits, spyware, dishonest adware, hijackers, backdoors, malicious layered service providers (LSPs), dialers and fraudtools. The one or more anti-virus scanning engines 130 may utilize any suitable method for scanning, detecting and/or removing malware. For example, signature-based detection may include searching software files for known patterns of data that may be utilized within executable code. Alternatively, heuristic methods such as generic signatures may be utilized where files may be searched for known malicious code or variations of known code. However, the system is not limited with respect to a specific method for scanning stored information and/or for detecting malicious software. Furthermore, the one or more anti-virus scanning engines may be operable to detect when a file or information stored on the removable media device 110 comprises executable code. For example, in instances when the operating system 140 comprises a Microsoft Windows operating system, the one or more anti-virus engines 130 may examine the files and look for Portable Executable (PE) headers. If a PE header is detected in a file, the file may be classified as an executable file. The one or more anti-virus scanning engines 130 may be referred to as a scanning system. The one or more service daemons 136 may receive requests or messages and from the ARM system 120 and may communicate with or respond to the ARM system 120.

In some systems, one or more of the anti-virus scanning engines 130 may comprise third party software. The third party software may comprise a plurality of products from a plurality of different vendors or including different brands of software products. Some exemplary third party products include McAfee Anti-virus, McAfee Internet Security, McAfee Total Protection, McAfee All Access, Norton Anti-virus, Norton Internet Security, Norton 360, Microsoft Security Essentials, Microsoft Forefront and Antivirus Gold (AVG).

The ARM system 120 may comprise application software and may include the kernel filter driver 124. The kernel filter driver 124 may be part of the operating system 140, for example, it may be a driver within the operating system and/or it may have hooks into the operating system 140. In some systems, the operating system 140 may comprise a Microsoft Windows operating system and the kernel filter driver 124 may comprise a driver in the Windows operating system and may have hooks into the Windows operating system. The kernel filter driver 124 may be operable to broker access to the removable media device 110 or to other media devices which may be communicatively coupled to the computer system 550. The kernel filter driver 124 may be operable block all access to the removable media device 110 except, to software or hardware which it directs to access the removable media device 110. In this regard, the kernel filter driver 124 may be operable make the removable media device 110 exclusively accessible to an anti-virus engine 130. For example, the kernel filter driver 124 may block access by one or more of: the operating system 140 and associated device drivers (not shown), the one or more anti-virus engines 130 and/or other software such as application software 150. In systems where the operating system 140 includes a Microsoft Windows operating system, the kernel filter 124 may be operable to exclude Windows and auto-run functions from accessing the removable media device 110, for example, when the removable media device 110 is plugged into an interface of the computer system 550. Moreover, the kernel filter 124 may be operable to grant to: the operating system 140, the one or more anti-virus engines 130 or other software such as application software 150, access to the one or more files on the removable media device 110 or other memory devices which may be communicatively coupled to the computer system 550. For example, in instances when the one or more anti-virus engines 130 comprises a plurality of anti-virus engines, the kernel filter 124 may block access by the operating system 140 and may direct all or a portion of the anti-virus engines 130, in serial, to access and process the data and/or software files stored on the removable media device 110.

The kernel filter driver 124 may be configured to select one or more of the anti-virus engines 130 to scan or process the information stored on the removable media device 110 in a specified way. For example, the kernel filter driver 124 may direct McAfee anti-virus software to scan the removable media device 110 and may receive results of the scan from the McAfee software. Subsequently, the kernel filter driver may direct Norton software to scan the removable media device 110 and provide results. Subsequently, the kernel filter driver may direct the Microsoft anti-virus software to scan the removable device 110 and report the results. The ARM system 120 may utilize the results from all three scans to determine which files on the removable media device 110 are safe to access and may grant access of the safe files, to the operating system 140 and/or other software or users requesting access. The kernel filter driver 124 may be referred to as a kernel driver.

In some systems, the kernel filter driver 124 may be operable to distribute content from a plurality of removable media devices 110 over a plurality of the anti-virus scanning engines 130. For example, the plurality of engines 130 may scan the content concurrently.

In some systems, one or more of the anti-virus scanning engines 130 may comprise one or more virtual machines. The kernel driver 124 which may sit between the removable media device 110 and the operating system 140, the one or more anti-virus scanning engines 130, a user or the application software 150, for example. The kernel driver 124 may isolate the removable media device 110 and may submit the contents of the device 110 to a virtual machine (VM) containing an entire anti-virus scanning system 130. The VM scanning system 130 may perform scans or other verification mechanisms to ensure the removable media device 110 does not contain malware. The kernel driver 124 may manage the removable media device 110 access to ensure that only authorized scanning software can access the remote media device 110. After a first scanner finishes, the kernel driver 124 may advance to a next scanner if available. Once all the scanners finish, a scanning daemon 136 may inform the kernel driver 124 of the results. The kernel driver 124 may not allow access to any file in which at least one scanner indicated an infection. The kernel driver 124 may prohibit access to the file, thereby preventing infection of the computer system 550 or any networked devices. Once cleared, approved files from the removable media device 110 may be presented to the operating system 140 and they may become available to users and the application software 150.

The ARM system 120 may be operable to block the operating system 140 or any other software such as operating system 140 drivers (not shown) or application software 150, from accessing files that may be stored on the removable media device 110, in instances when the files comprise executable code. The kernel filter driver 124 may be operable to direct one or more of application software of the ARM system 120, the one or more virtual machine scanning systems 130, and the one or more anti-virus engines 130 to detect executable code on the removable media device 110. For example, in instances when the operating system 140 comprises a Windows operating system, the one or more anti-virus engines 130 may examine files and look for Portable Executable (PE) headers which may be associated with executables on Windows systems. If any file includes such a header, it may be classified as an executable. The kernel filter driver 124 may then prevent access to any executable files on the removable device 110. Alternatively, the one or more virtual machine scanning systems 130 or the application software of the ARM system 120 may be operable to perform examination of the files to look for the PE headers and classify the files as executable.

In some systems, the ARM system 120 may comprise the configuration software 122 which may be utilized to configure one or both of the ARM system and the anti-virus engines 130. The configuration software 122 may determine or define which of the one or more anti-virus engines 130 may be utilized to process the information stored on the removable media device 110 or other memory devices. The configuration software 122 may specify specific features of the anti-virus engines to utilize or parameters that may be passed to the one or more anti-virus engines 130. Furthermore, the configuration software 122 may determine how the kernel filter driver 124 operates and which features of the kernel filter driver 124 may be utilized to process the information stored in the removable media device 110. In some systems, the kernel filter device 124 may be configured to direct one or more of application software 150 of the ARM system 120, a virtual machine scanning system 130 or one or more of the anti-virus engines 130 to detect executable code stored on the removable media device 110 and to block the operating system 140 or other software such as application software 150 running on the computer system 550, from accessing the executable code. The ARM system 120 may be configured to process information stored in one or more specified memory devices which are communicatively coupled to the computer system 550.

In some systems, the configuration software 122 may comprise a user interface, for example, a Microsoft Windows user interface, that may allow a user, such as, a system administrator to configure or select features or parameters of the ARM system 120. In this manner, the user may configure operations of the ARM system 120, for example, operations by the kernel filter driver 124 and/or specified usage of the one or more anti-virus engines 130 as described above.

In-line scanning of removable media may reduce system performance and may be incurred each time media is loaded. To avoid this, the contents of a scanned media device 110 may be cached by the ARM system 120. In instances when the media device 110 may be reinserted, it may be matched with a cached record and the cached version of files may be returned the system, eliminating a need to rescan the files. For new files that may be detected on the media device 110, such as when additional files are added to a USB drive by another machine, directory or file allocation table (FAT) information may be used to detect differences from a cached media device image, which may cause the new entries to be scanned and added to the cache. The unmodified files may still be loaded from the cache. Moreover, cached removable media content may enable the ARM system 120 to rescan at a later time. Thus, an organization may systematically detect machines that may have been previously exposed to "zero-day" attacks, in which malware was encountered before scanning software was updated to recognize it. Under existing systems, such malware could go undetected in an initial screening and may propagate through a network without any record of an initial point of entry. In this manner, the ARM system 120 may increase accountability of media and data sources.

In some systems, the ARM system 120 may log scanning history or scanning results, which may include information from a plurality of the anti-virus scanning engines 130. The logged information may provide auditing trails for malicious software to system users.

Figure 2:
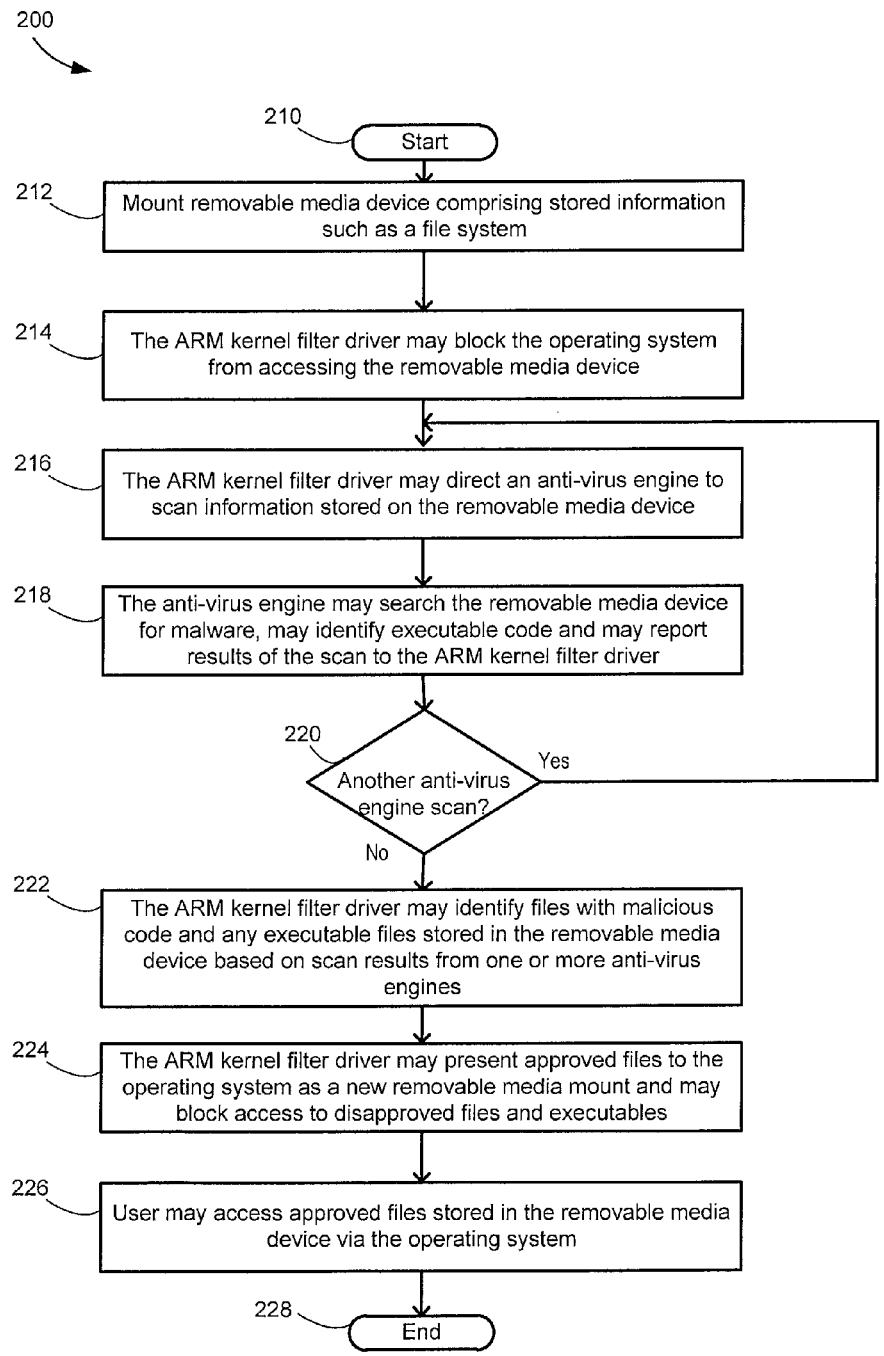
FIG. 2 is a flow chart representing exemplary steps performed by an architecture for removable media (ARM) system, for scanning and controlling access to information stored on external memory.

In operation, the ARM system 120 may perform all or a portion of the steps described with respect to FIG. 2. In some systems, the steps may be performed in a different order than the order shown in FIG. 2.

FIG. 2 is a flow chart representing exemplary steps performed by an architecture for removable media (ARM) system, for scanning and controlling access to information stored on removable memory. Referring to FIG. 2, the exemplary steps may begin at start step 210. In step 212, the removable media device 110 may be communicatively coupled to the computer system 550. In step 214, the ARM kernel filter driver 124 may block the operating system 140 from accessing the removable media device 110 and may control access to it. In step 216, the ARM kernel filter driver 124 may direct one of the one or more anti-virus engines 130 to scan the removable media device 110. In step 218, one of the one or more anti-virus engines 130 may scan files stored in the removable media device 110 for malicious software or any executable code, and the daemon 136 may report the results to the ARM kernel filter driver 124. In step 220, in instances when there are no additional scans to be performed by one of the one or more anti-virus engines 130, the exemplary steps may proceed to step 222. In step 222, based on the results from the one or more anti-virus engines 130, the ARM kernel filter driver 124 may identify which files stored in the removable media device 110 comprise malicious software and which files are clear of any malicious software. In some systems the ARM system 120 may determine which files comprise executable code. In step 224, the ARM kernel filter driver 124 may present approved files in the removable media device 110 to the operating system 140 as a new removable media mount and may block access to disapproved files and executables. In step 226, the operating system 140 may present approved files stored in the removable media device 110 to application software or to users that may access the approved files. The exemplary steps may end at step 228. In step 220, in instances when there are additional anti-virus engines 130 available or additional scans to be performed by one or more anti-virus engines 130, the exemplary steps may proceed to step 216.

Figure 3:
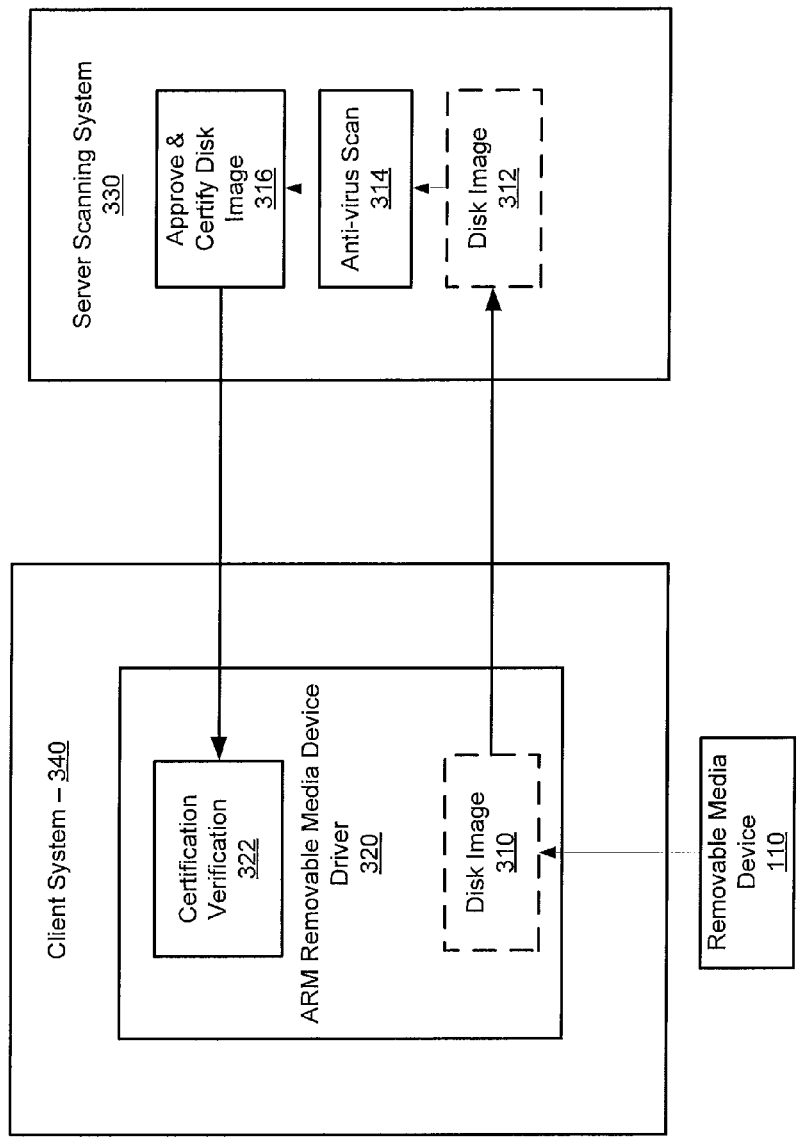
FIG. 3 illustrates an architecture for removable media which may utilize a centralized scanning system.

FIG. 3 illustrates an architecture for removable media which may utilize a centralized scanning system. Referring to FIG. 3, a system 300 may include a client system 340 which may reside on the computing system 550 (described with respect to FIG. 5). The client system 340 may comprise a removable media device driver 320 and a certification verification unit 322. The system 300 may also comprise a scanning system server 330 which may reside on the same computer system 550 as the client system 340 or may reside on a separate computing device which may be communicatively coupled with the client system 340 via a network, for example. The scanning system server 330 may comprise an approve-and-certify unit 316 and an anti-virus scanner 314.

The removable media device driver 320 may create a disk image 310 of the removable media device 110 and may send it to the scanning system server 330. The disk image 310 may be communicated in an encrypted format. The anti-virus scanner 314 may scan the content of the disk image 312 and may detect malicious software or may determine that the disk image 312 is clear of malicious software. In instances when the disk image 312 is clear of malware, the approve-and-certify unit 316 may approve the content in the disk image 312 and may communicate certification of the disk image 312 to the client system 340. The certification verification unit 322 may verify the certification. In instances when the verification is successful, the removable media device 110 may be submitted to an operating system in the client system 340 and a user or application software may be allowed to access content on the removable media device 110. In some systems, the disk image 310 may be communicated to a plurality of computing devices which comprise scanning systems, which may each scan the disk image 312 for malware.

Figure 4:
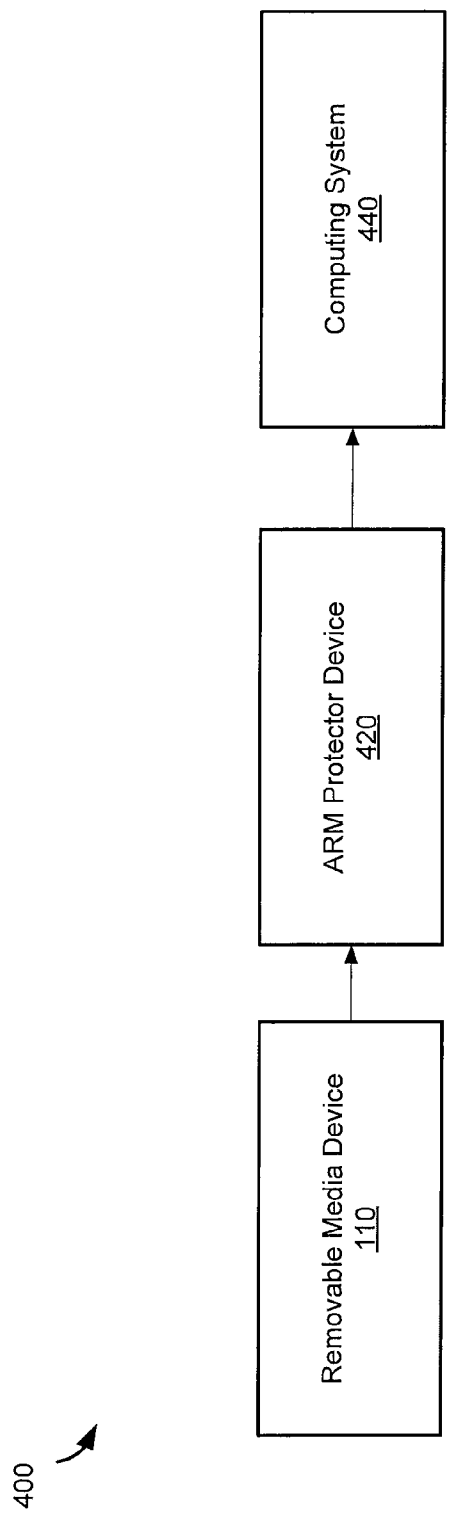
FIG. 4 illustrates an architecture for removable media (ARM) device.

FIG. 4 illustrates an architecture for removable media (ARM) device. Referring to FIG. 4, there is shown the removable media device 110, an ARM protector device 420 and a computing system 440. The computing system 440 may be similar or substantially the same as the computing system 550 and may be operable to access content stored on the removable media device 110 based on functions of the ARM protector device 420. The ARM protector device 420 may be a processing device that may comprise a system which may perform functions similar to or substantially the same as the ARM system 120 described with respect to FIGS. 1, 2, 3 and 5. The ARM protector device 420 may be connected between the removable media device 110 and the computing system 440 utilizing any suitable interfaces, for example, USB and/or other interfaces. In some systems, the ARM protector device 420 may be a portable or detachable unit. For example, the ARM protector device 420 may have a form factor which is similar or substantially the same as a portable USB storage device. However, the ARM protector device 420 is not limited with respect to any specific size or form factor. In some systems, the ARM protector device 420 may be integrated within another device, for example, the computing system 440. In a centralized system, the ARM device 420 may be operable to intercept the removable media device 110 and perform the required networking to communicate a disk image to the scanning system server 330 described with respect to FIG. 3.

FIG. 5 illustrates one embodiment of a computing device that may host the architecture for removable media (ARM) system 120 or 320 described with respect to FIG. 1, 2, 3 or 4. A computer system 550 may comprise the architecture for removable media logic, which, when executed, may cause the computer system 550 to perform any of the logic and/or steps disclosed herein. The computer system 550 may operate as a standalone device or may be connected, for example, using a network or other connection, to other computing systems or peripheral devices. The architecture for removable media system 120 or 320 may be implemented through hardware, software or firmware, or any combination thereof. Alternative software implementations may include, but are not limited to, distributed processing or component/object distributed processing, parallel processing, or virtual machine processing may also be constructed to implement the tools described herein.

In a networked deployment, the computer system 550 may operate in the capacity of a server or as a client user computer in a server-client user network environment, or as a peer computer system in a peer-to-peer (or distributed) network environment. The computer system 550 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, or any other machine capable of executing the architecture for removable media system 120 or 320 logic that specifies actions to be taken by that machine. The computer system 550 may comprise electronic devices that provide voice, video or data communication. The system implementation may be a single computer system 550, or may include any collection of systems or sub-systems that individually or jointly execute a set, or multiple sets, of instructions to perform any of the processing for the architecture for removable media and communications noted above.

The computer system 550 may include a processor 502, for example, a central processing unit (CPU), a graphics processing unit (GPU), or both. A processor may be implemented as a controller, microprocessor, digital signal processor, microcontroller, application specific integrated circuit (ASIC), discrete logic, or a combination of other types of circuits or logic. Moreover, the computer system 550 may include a memory 504 that may communicate via a bus 508. The memory 504 may be a main memory, a static memory, or a dynamic memory. The memory 504 may include, but may not be limited to internal and/or external computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 504 may include a cache or random access memory for the processor 502. Alternatively or in addition, the memory 504 may be separate from the processor 502, such as a cache memory of a processor, the system memory, or other memory.

In some systems, the computer system 550 may further include a display 510, such as a liquid crystal display (LCD), an organic light emitting diode (OLED), a flat panel display, a solid state display, or a cathode ray tube (CRT). Additionally, the computer system 550 may include an input device 512, such as a keyboard and/or a cursor control device such as a mouse or any other suitable input device. The computer system 550 may also include a disk drive unit 506, a signal generation device 516, such as a speaker or remote control, and one or more communication interfaces devices 514. The one or more communication interface devices 514 may include any suitable type of interface for wireless, wire line or optical communication between the computer system 550 and another device or network, for example, the removable media device 110, the scanning server system 330 and/or the ARM protector device 420. The computer system 550 may be communicatively coupled with a network 518 via the one or more communication interface devices 514. The computer system 550 may be communicatively coupled via the communication interfaces 514 to an external and/or removable memory device, for example, the removable media device 110. In some systems, the removable media device 110 may be coupled via a USB connection. In some systems, an external memory or the removable media device 110 may be communicatively coupled via the network 518 to the communication interface 514.

The disk drive unit 506 may include a computer-readable medium 522 in which one or more sets of instructions 524, for example, software, may be embedded. Further, the instructions 524 may embody one or more of the methods and/or logic as described herein for the ARM system 120, the ARM system 320 or the one or more anti-virus scanning engines 130, for example. In a particular embodiment, the instructions 524 may reside completely, or at least partially, within the main memory or static memory 504, and/or within the processor 502 during execution by the computer system 350. The memory 504 and/or the processor 502 also may include computer-readable media.

In general, the ARM system 120 or ARM system 320, logic and processing or the anti-virus engine 130 logic and processing described above may be encoded and/or stored in a machine-readable or computer-readable medium such as a compact disc read only memory (CDROM), magnetic or optical disk, flash memory, random access memory (RAM) or read only memory (ROM), erasable programmable read only memory (EPROM) or other machine-readable medium as, for examples, instructions for execution by a processor, controller, or other processing device. The medium may be implemented as any device or tangible component that contains, stores, communicates, propagates, or transports executable instructions for use by or in connection with an instruction executable system, apparatus, or device. Alternatively or additionally, the logic may be implemented as analog or digital logic using hardware, such as one or more integrated circuits, or one or more processors executing instructions that perform the processing described above, or in software in an application programming interface (API) or in a Dynamic Link Library (DLL), functions available in a shared memory or defined as local or remote procedure calls, or as a combination of hardware and software. In some systems, the ARM protector device 420 may be integrated within the computer system 550.

The system may include additional or different logic and may be implemented in many different ways. Memories may be Dynamic Random Access Memory (DRAM), Static Random Access Memory (SRAM), Flash, or other types of memory. Parameters (e.g., conditions and thresholds) and other data structures may be separately stored and managed, may be incorporated into a single memory or database, or may be logically and physically organized in many different ways. Programs and instructions may be parts of a single program, separate programs, implemented in libraries such as Dynamic Link Libraries (DLLs), or distributed across several memories, processors, cards, and systems.

In some systems, a method of protecting a computer system from malware residing on a USB storage device includes the following steps. A USB device scanner may be inserted between a USB storage device and a USB port connected to the computer system. A disk image of the original electronic media stored on the USB storage device may be created with a USB device driver residing on the USB device scanner. The disk image may be sent to a screening server residing on the computer system. The disk image may be screened with malware detection software within the screening server. The disk image may be certified and approved as not being infected with malware by the screening server. The certification may be verified by the USB device scanner; and the original media from the USB storage device may be submitted to the computer system if no malware is found.

In some systems, a method of protecting a computer system from malware residing on a USB storage device comprises the following steps. A USB storage device may be inserted into a USB port connected to the computer system. An exclusive file system access mount may be provided to the USB device. The media stored on the USB storage device may be submitted to one or more scanning software programs on the computer system. The media may be scanned with the one or more scanning software programs. The disk image may be certified and approved as not being infected with malware by the screening server if no malware is found. The certification may be verified by the USB device scanner and the original media from the USB storage device may be submitted to the computer system as a new USB mount.

In some systems, a device for scanning a USB storage device for malware may comprise the following elements. A body may have a port for accepting the USB storage device with stored computer-readable media and a plug for insertion into a USB port of a computing system. A software driver may reside on the device, the driver may have a series of executable commands for creating a disk image of the media and sending the disk image to a screening server residing on the computing system, verifying the screening results from the computing system, and presenting the media to the computing system if no malware exists.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method for secure access to storage media, the method comprising the steps of:
    in a computing system including an operating system and application software the computing system being communicatively coupled to a storage device having stored information, wherein the operating system comprises a kernel filter driver of the operating system, or the kernel filter driver of the operating system has hooks into the operating system and the kernel filter driver of the operating system is operable to broker access to the storage device;
    blocking, by the kernel filter driver of the operating system, all access to the storage device except for granting exclusive access to the storage device to a first anti-virus engine of a plurality of anti-virus engines and directing the first anti-virus engine to scan the information stored on the communicatively coupled storage device for malicious software;
    receiving, by the kernel filter driver of the operating system, results from the first anti-virus engine; and
    presenting, by the kernel filter driver of the operating system, the storage device to the operating system and enabling the operating system to access approved information stored on the storage device in instances when all or a portion of the stored information is approved.

2. The method of claim 1 further comprising:
    advancing, by the kernel filter driver of the operating system, one anti-virus engine at a time to a second anti-virus engine or to more anti-virus engines;
    blocking, by the kernel filter driver of the operating system, all access to the storage device except for granting exclusive access to the storage device to the second or more other anti-virus engines one anti-virus engine at a time, wherein the second or more other anti-virus engines are different than the first ant-virus engine;
    directing the second or more other anti-virus engines to scan the information stored on the communicatively coupled storage device for malicious software one at a time during exclusive access to the storage device;
    receiving results from the second or more other anti-virus engines; and
    determining whether all or a portion of the information stored on the storage device is approved or disapproved based on the results from the first anti-virus engine and results from the second or more other anti-virus engines prior to the presenting the storage device to the operating system and enabling the operating system to access approved information stored on the storage device in instances when all or a portion of the stored information is approved.

3. The method of claim 2, wherein the kernel filter driver of the operating system performs one or more of the blocking all access to the storage device except for granting exclusive access to the storage device to the first anti-virus engine, the granting exclusive access to the storage device to a second or more other anti-virus engines one at a time, the directing the second or more other anti-virus engines to scan the information stored on the communicatively coupled storage device for malicious software one at a time during exclusive access to the storage device, the receiving results from the second or more other anti-virus engines, the determining whether all or a portion of the information stored on the storage device is approved or disapproved, the presenting the storage device to the operating system and the enabling the operating system to access approved information stored on the storage device, relative to the scanning of information stored on the communicatively coupled storage device, by the first anti-virus engine or by the second or more other anti-virus engines.

4. The method of claim 3, wherein one or more of:
    the kernel filter driver of the operating system;
    the first anti-virus engine; and
    the first anti-virus engine and the second or more other anti-virus engines,
    are configurable by a user.

5. The method of claim 1, further comprising, determining that all or a portion of the information stored on the storage device is disapproved in instances when the information stored on the storage device comprises one or both of malicious software and executable software.

6. The method of claim 1, wherein at least the first anti-virus engine resides on the computing system or resides on a separate computing system communicatively coupled to the computing system by a network.

7. A system for secure access to storage media, the system comprising one or more circuits or processors, said one or more circuits or processors being operable to:
    in a computing system including an operating system and application software, the computing system being communicatively coupled to a storage device having stored information, wherein the operating system comprises a kernel filter driver of the operating system, or the kernel filter driver of the operating system has hooks into the operating system and the kernel filter driver of the operating system is operable to broker access to the storage device;
    block, by the kernel filter driver of the operating system, all access to the storage device except grant exclusive access to the storage device to a first anti-virus engine and direct the first anti-virus engine to scan the information stored on the communicatively coupled storage device for malicious software;
    receive, by the kernel filter driver of the operating system, results from the first anti-virus engine; and
    present, by the kernel filter driver of the operating system, the storage device to the operating system and enable the operating system to access approved information stored on the storage device in instances when all or a portion of the stored information is approved.

8. The system of claim 7 wherein said one or more processors or circuits are operable to:
    advance, by the kernel filter driver of the operating system, one anti-virus engine at a time to a second anti-virus engine or to more anti-virus engines;

block, by the kernel filter driver of the operating system, all access to the storage device except to grant exclusive access to the storage device to the second or more other anti-virus engines one anti-virus engine at a time, wherein the second or more other anti-virus engines are different than the first anti-virus engine;

direct the second or more other anti-virus engines to scan the information stored on the communicatively coupled storage device for malicious software one at a time during exclusive access to the storage device;

receive results from the second or more other anti-virus engines; and determine whether all or a portion of the information stored on the storage device is approved or disapproved based on the results from the first anti-virus engine and results from the second or more other anti-virus engines prior to the presenting the storage device to the operating system and enabling the operating system to access approved information stored on the storage device in instances when all or a portion of the stored information is approved.

9. The system of claim 8, wherein the kernel filter driver of the operating system performs one or more of the blocking all access to the storage device except for granting exclusive access to the storage device to the first anti-virus engine, the granting exclusive access to the storage device to a second or more other anti-virus engines one at a time, the directing the second or more other anti-virus engines to scan the information stored on the communicatively coupled storage device for malicious software one at a time during exclusive access to the storage device, the receiving results from the second or more other anti-virus engines, the determining whether all or a portion of the information stored on the storage device is approved or disapproved, the presenting the storage device to the operating system and the enabling the operating system to access approved information stored on the storage device, relative to the scanning of information stored on the communicatively coupled storage device, by the first anti-virus engine or by the second or more other anti-virus engines.

10. The system of claim 9, wherein one or more of:
the kernel filter driver of the operating system;
the first anti-virus engine; and
the first anti-virus engine and the second or more other anti-virus engines,
are configurable by a user.

11. The system of claim 7, further comprising, determining that all or a portion of the information stored on the storage device is disapproved in instances when the information stored on the storage device comprises one or both of malicious software and executable software.

12. The system of claim 7, wherein at least the first anti-virus engine resides on the computing system or resides on a separate computing system communicatively coupled to the computing system by a network.

13. A non-transitory computer readable medium having stored thereon one or more instructions for secure access to storage media, the one or more instructions executable by one or more processors to cause the one or more processors to perform steps comprising:

in a computing system including an operating system and application software, the computing system being communicatively coupled to a storage device having stored information, wherein the operating system comprises a kernel filter driver of the operating system, or the kernel filter driver of the operating system has hooks into the operating system and the kernel filter driver of the operating system is operable to broker access to the storage device;

blocking, by the kernel filter driver of the operating system, all access to the storage device except granting exclusive access to the storage device, to a first anti-virus engine and directing the first anti-virus engine to scan the information stored on the communicatively coupled storage device for malicious software;

receiving, by the kernel filter driver of the operating system, results from the first anti-virus engine; and presenting, by the kernel filter driver of the operating system, the storage device to the operating system and enabling the operating system to access approved information stored on the storage device in instances when all or a portion of the stored information is approved.

14. The non-transitory computer readable medium of claim 13 further comprising:

advancing, by the kernel filter driver of the operating system, one anti-virus engine at a time to a second anti-virus engine or to more anti-virus engines;

blocking, by the kernel filter driver of the operating system, all access to the storage device except granting exclusive access to the storage device to the second or more other anti-virus engines one anti-virus engine at a time, wherein the second or more other anti-virus engines are different from the first anti-virus engine;

directing the second or more other anti-virus engines to scan the information stored on the communicatively coupled storage device for malicious software one at a time during exclusive access to the storage device;

receiving results from the second or more other anti-virus engines; and determining whether all or a portion of the information stored on the storage device is approved or disapproved based on the results from the first anti-virus engine and results from the second or more other anti-virus engines prior to the presenting the storage device to the operating system and enabling the operating system to access approved information stored on the storage device in instances when all or a portion of the stored information is approved.

15. The non-transitory computer readable medium of claim 14, wherein the kernel filter driver of the operating system performs one or more of the blocking all access to the storage device except for granting exclusive access to the storage device to the first anti-virus engine, the granting exclusive access to the storage device to a second or more other anti-virus engines one at a time, the directing the second or more other anti-virus engines to scan the information stored on the communicatively coupled storage device for malicious software one at a time during exclusive access to the storage device, the receiving results from the second or more other anti-virus engines, the determining whether all or a portion of the information stored on the storage device is approved or disapproved, the determining whether all or a portion of the information stored on the storage device is approved or disapproved, the presenting the storage device to the operating system and the enabling the operating system to access approved information stored on the storage device, relative to the scanning of information stored on the communicatively coupled storage device, by the first anti-virus engine or by the second or more other anti-virus engines.

16. The non-transitory computer readable medium of claim 15, wherein one or more of:

the kernel filter driver of the operating system;
the first anti-virus engine; and
the first anti-virus engine and the second or more other anti-virus engines,
are configurable by a user.

17. The non-transitory computer readable medium of claim 13 further comprising, determining that all or a portion of the information stored on the storage device is disapproved in instances when the information stored on the storage device comprises one or both of malicious software and executable software.

18. The non-transitory computer readable medium of claim 13, wherein at least the first anti-virus engine resides on the computing system or resides on a separate computing system communicatively coupled to the computing system by a network.

* * * * *